Patented Nov. 10, 1953

2,658,926

UNITED STATES PATENT OFFICE 2,658,926

CHLORINATED POLYCYCLIC COMPOUNDS

Julius Hyman and Abe A. Danish, Denver, Colo., assignors, by mesne assignments, to Shell Development Company, Emeryville, Calif., a corporation of Delaware No Drawing. Application August 21, 1948,
Serial No. 45,575

10 Claims. (Cl. 260—649)

This invention relates to new halogenated polycyclic hydrocarbons obtained by causing aromatic hydrocarbons to act as dienophiles in the Diels-Alder reaction.

One object of this invention is the production of new polycyclic hydrocarbon derivatives.

Another object of this invention is the production of a Diels-Alder reaction product wherein an aromatic ring hydrocarbon compound acts as a dienophile.

An additional object of this invention is the formation of diadducts and monoadducts by the Diels-Alder synthesis in which the dienophile is a linear polycyclic aromatic hydrocarbon, whereby the aromatic ring is directly attached to the conjugated diene.

A more specific object of this invention is to form a Diels-Alder reaction product from naphthalene or anthracene acting as a dienophile, and hexachlorocyclopentadiene as the conjugated diene, and there is brought about direct attachment of an aromatic ring.

Other objects, features, capabilities and advantages are comprehended by the invention, as will later appear and as are inherently possessed thereby.

The Diels-Alder diene synthesis is, by this time, well known and widely applied. Specifically, this reaction process comprises the addition to a double bond (called a dienophilic double bond) of the terminal carbon atoms of a conjugated 1,3-dienic system, as illustrated in the following equation:

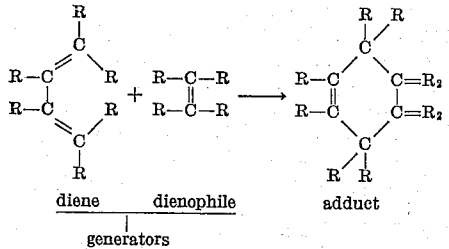

Both the diene and the dienophile can be polysubstituted by a multiplicity of groups without hindering the reaction. The conjugated diene system can be part, at least to a limited extent, of an aromatic system and still take part in reactions of this type.

However, insofar as the dienophilic double bond is concerned, it has hitherto been restricted to double bonds not a part of aromatic systems and it has been generally believed by those skilled in the art that "double bonds" of the aromatic type were incapable of acting as dienophiles.

Our discovery that certain classes of dienes can be made to react with naphthalene, anthracene, furan, 2-methyl furan, to form Diels-Alder diene synthesis products is therefore novel, completely unexpected, and possesses, to a high degree, both theoretical and practical significance.

We have found that hexahalocyclopentadiene reacts with naphthalene to form a diadduct of the latter possessing the carbon skeleton structure of a doubly bridged benzphenanthrene, the bridges being formed by dihalo methano groups lying across the halogenated rings.

These new reactions are carried out by heating together a hexahalocyclopentadiene and one of the polycyclic aromatic hydrocarbons, naphthalene or anthracene at temperatures in the range of 140°–180° C. for periods of time in excess of one hundred hours. In general, we have discovered the yield of the product desired is increased by an increase in the period allowed for reaction. By sacrifice of yield a shorter reaction time can be employed. Temperatures from about 50° C. to about 200° C. and a heating period of 10 to 300 hours can be employed. One should preferably operate within the range of about 120° C. to 180° C. for about 100–300 hours.

The extent to which the reaction proceeds is not greatly influenced by the molar ratio of the reactants and the latter, within wide limits, can, therefore, be chosen at the convenience of the operator. In most instances we prefer to use ratios of the hexahalocyclopentadiene to aromatic compound such that the initial boiling point of the combined reactants lies above the optimum temperatures for the reaction. In this way, the necessity for conducting the reaction at super-atmospheric pressures can be avoided. However, in some instances, as, for example, with furan, such a procedure leads to the utilization of altogether uneconomical amounts of the diene. In such cases, it is entirely satisfactory to seal the reactants into a suitable pressure vessel and to cause the reaction to proceed, in the necessary temperature range, at whatever pressure is developed by the reaction mixture.

The monoadduct formed by reaction between a hexahalocyclopentadiene and an aromatic dienophile reacts very readily with a second molecule of diene to form the diadduct. This tendency is so strong that the relative amounts of mono and diadduct obtained are substantially the same regardless of the mole ratio of reactants taken. As a result, as is under these circumstances to be expected, the amounts of monoadducts obtained are small and their isolation difficult.

We have also found that where the formation of a diadduct is made difficult by the presence, on the second double bond, of a blocking group, such, for example, as the methyl group in 2-methylfuran, the monoadduct can be more readily isolated.

The methods and processes to be used in carrying out our new and valuable discovery can best be made clear by means of concrete examples. Example I illustrates the preparation of the diadduct of naphthalene with two mols of hexachlorocyclopentadiene.

Example I

A mixture of 273 grams (1.0 moles) hexachlorocyclopentadiene and 512 grams (4.0 moles) naphthalene was heated at 150–160° C. for 200 hours. During the heating period the reactants formed a clear solution which darkened with increasing reaction time. At the end of the heating period the unreacted starting materials were removed by distillation in vacuo. A first fraction was collected, using a water aspirator, boiling between 80°–110° C. under 11 mm. Hg pressure; a second fraction was collected, using an oil pump, boiling between 60°–80° C. under 1 mm. Hg pressure. By this procedure there was obtained as residue in the distillation flask a viscous red oil. The viscous residue was cooled to 40° and stirred with 100 ml. of cole acetone. There was thus obtained a mixture consisting of an acetone solution and an insoluble crystalline material which was separated by filtration of the acetone solution. The acetone solution was saved for subsequent recovery of the monoadduct (see Example II). The solid left on the filter was washed with small portions of acetone until no color was imparted to the acetone. The crude solid thus obtained was recrystallized from heptane to yield a white crystalline product melting at 210°–211° C.

Analysis of this material gave the following results: Cl, 62.6%; Mol. Wt., 683. Calculated for $C_{20}H_8Cl_{12}$: Cl, 63.20%; Mol Wt. 674.

The material is, therefore, the diadduct obtained by the Diels-Alder reaction of two moles of hexachlorocyclopentadiene with one mole of naphthalene and presumably possesses the following structural formula:

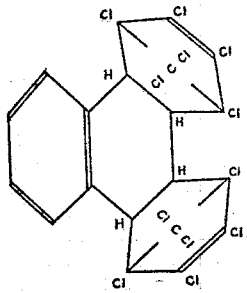

Example II represents the isolation of the monoadduct of hexachlorocyclopentadiene and naphthalene from the reaction mixture of Example I.

Example II

The acetone filtrate obtained as indicated in the work-up described in Example I above was heated to remove the acetone solvent. There was thus obtained an oily residue which was subjected to vacuum distillation. The fraction, boiling between 90°–160° C. under 0.5 mm. Hg pressure, which consisted of a red viscous oil, was first obtained. This material is comprised chiefly of the reaction products resulting from the prolonged heating of the hexachlorocyclopentadiene and was discarded.

Following isolation of this fraction of material, the remaining residue was transferred to an apparatus which would allow relatively short path distillation and the fraction, boiling between 170°–210° C. under 0.5 mm. Hg pressure, consisting of a red gummy material was collected. Crystallization of this red gum from hexane resulted in the isolation of a crystalline solid melting at 163°–164° C.

Cl, 52.7%; Mol. Wt., 354. Calculated for $C_{15}H_8Cl_6$: Cl, 53.1%; Mol. Wt., 401.

The compound is thus the monoadduct resulting from the reaction of one mole of hexachlorocyclopentadiene with one mole of naphthalene and presumably possessing the following structural formula:

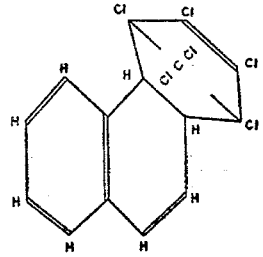

It is interesting to note that the products both of Example I and Example II when subjected to spectroscopic analysis using ultraviolet light showed the presence of an intact benzene ring and the absence of the naphthalene ring structure, thus further confirming the nature of the products obtained.

Example III illustrates a similar reaction utilizing anthracene as the dienophilic generator in the Diels-Alder synthesis.

Example III

A solution of 89.0 grams (0.5 mole) of anthracene and 273 grams (1.0 mole) of hexachlorocyclopentadiene was heated at 150°–160° C. for 100 hours. The solution turned black during the latter half of the heating period. The flask contents were cooled to 80° C. and an equal volume of acetone was slowly added to the stirred reaction mixture.

A brown crystalline material was thus thrown out of solution; the material was collected on a filter and after drying melted between 230°–233° C. The material was further purified by dissolving it in xylene to which was added one mole of maleic anhydride. The resulting solution was refluxed for two hours. The solution was then cooled and treated first with small portions of 10% aqueous sodium hydroxide solution until the washings remained distinctly alkaline, then with 5% hydrochloric acid and, finally, with water. The resulting xylene solution was dried over anhydrous sodium sulfate: the solvent was removed and the resulting crystalline residue recrystallized from a heptane-ethanol solution. The white crystalline solid thus obtained melted at 233°–234° C. The following results were obtained on analysis:

Cl, 59.10%; Mol. Wt., 766. Calculated for $C_{24}H_{10}Cl_{12}$: Cl, 58.8%; Mol. Wt., 724.

The compound is thus the Diels-Alder diadduct resulting from the reaction of two moles of hexachlorocyclopentadiene with one mole of anthracene acting as the dienophile and presumably possesses the following structural formula:

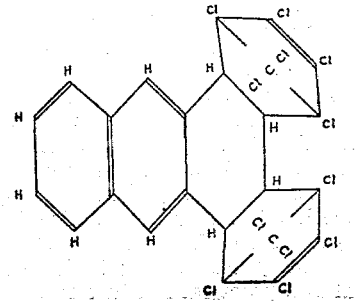

Example IV illustrates the reaction of furan as the dienophilic generator in the Diels-Alder diene synthesis.

*Example IV*

A mixture of furan (114.0 grams—1.9 moles) and hexachlorocyclopentadiene (1455 grams—5.0 moles) was heated at 70° C. for 100 hours in a flask equipped with a reflux condenser. The reaction mixture, which showed the presence of a crystalline precipitate, was distilled in vacuo to remove unreacted starting materials. The solid residue thus obtained was recrystallized, with intermediate charring of the solution to remove impurities, from boiling toluene. The following results were obtained on analysis:

Cl, 68.7%. Calculated for $C_{14}H_4OCl_{12}$: Cl, 69.3%.

The white crystalline material thus obtained melted at 285°–286° C. The compound is thus the diadduct resulting from the Diels-Alder reaction of two moles of hexachlorocyclopentadiene as the dienic generator with one mole of furan, as the dienophilic generator, possessing the presumable structural formula:

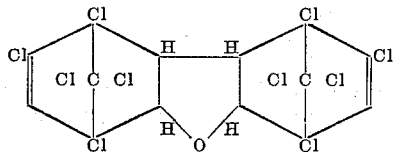

Example V illustrates the preparation of a monoadduct of 2-methyl-furan in a reaction in which the furan acts as a dienophile.

*Example V*

A solution of 82.0 grams (1 mole) of 2-methyl-furan and 91 grams (0.33 mole) of hexachlorocyclopentadiene was heated at 65–75° C. for a total of 10 hours in a flask equipped with a reflux condenser. Distillation, first at atmospheric pressure and then under a vacuum produced by a water aspirator, was employed to remove unchanged starting materials. The oily material thus obtained as a residue was then distilled in vacuo: the material, boiling between 110°–125° C. under 0.5 mm. Hg pressure, was collected. Repeated crystallization of this distillate from cold pentane yielded white crystals melting at 42.0°–42.5° C. The new compound is thus the monoadduct resulting from the Diels-Alder reaction of one mole hexachlorocyclopentadiene as the dienic generator with one mole of 2-methylfuran as the dienophilic generator and presumably possesses the following structural formula:

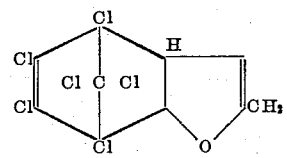

The disclosure of our present invention makes clear the reasons for the failure to obtain reactions of this type in the past and leads to an understanding of the causes of the erroneous belief commonly held by those skilled in this field that the aromatic "double bond" is incapable of acting as a dienophile in Diels-Alder reactions. It would now appear that the long time periods and high temperatures generally required to obtain our new compositions of matter tend to preclude successful accomplishment of the reaction except with dienes incapable of reacting with themselves by dimerization or polymerization. This fact may be more exactly presented if the foregoing statement is modified by the limitation on the diene of relatively slow self-reaction rather than complete inability to react with itself.

In view of these facts, it will at once be apparent to those skilled in the art that obvious modifications of our herein disclosed invention can readily be accomplished.

These new compositions of our invention are valuable as intermediates in the synthesis of many compounds useful in the arts and sciences. Since, for the most part, they retain an intact aromatic nucleus, they are capable of undergoing most or all of the usual reactions of aromatic compounds.

In this connection reference is made to copending patent application, Serial No. 221,736, filed April 18, 1951, by Julius Hyman and Milton Silverman, entitled "Process for the Production of Naphthalene and Related Derivatives and CHTP Derivatives.

They can thus be incorporated into dyes, pharmaceuticals, detergents, and many other classes of useful compounds. It is also to be anticipated that many of them, will find general usefulness as plasticizers and in the preparation of adhesives, tackifiers, etc. These materials should also be useful in themselves as, and as intermediates for the preparation of, insecticides and allied biologically active compounds.

The various structural formulae herein indicated are believed to be accurate. Moreover, the various examples and modifications of our invention hereinbefore given and discussed have been presented for illustrative purposes only and are not to be taken, in any sense, as defining the scope thereof which is actually to be limited only by the claims hereinafter set forth.

It is claimed:

1. A Diels-Alder adduct representing at least one mole of hexachlorocyclopentadiene, but not over two moles, reacted with one mole of a member of the group consisting of naphthalene and anthracene, the said adducts being selected from the group consisting of (1) the compound represented by the formula:

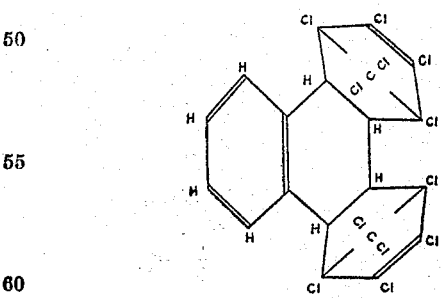

and whose empirical formula is $C_{20}H_8Cl_{12}$, (2) the compound represented by the formula:

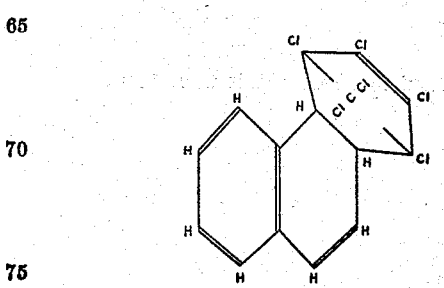

and whose empirical formula is $C_{15}H_8Cl_6$, (3) the compound represented by the formula:

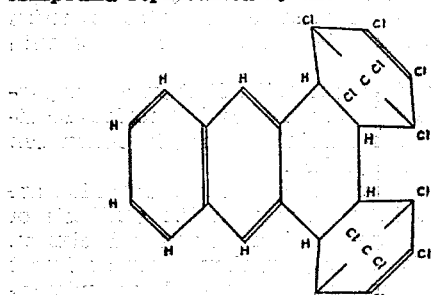

and whose empirical formula is $C_{24}H_{10}Cl_{12}$, and mixtures of (1) and (2).

2. The Diels-Alder diadduct representing 2 moles of hexachlorocyclopentadiene reacted with one mole of naphthalene and whose structural formula is:

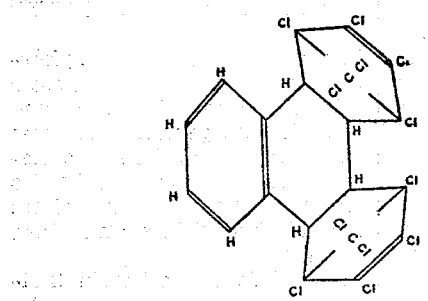

and whose empirical formula is $C_{20}H_8Cl_{12}$.

3. The Diels-Alder monoadduct representing one mole of hexachlorocyclopentadiene reacted with one mole of naphthalene, and whose structural formula is:

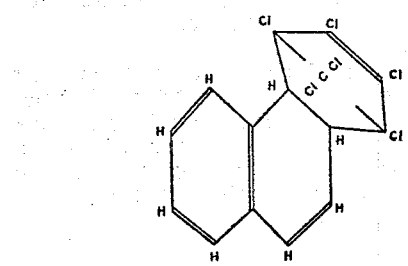

and whose empirical formula is $C_{15}H_8Cl_6$.

4. The Diels-Alder diadduct representing two moles of hexachlorocyclopentadiene reacted with one mole of anthracene, and whose structural formula is:

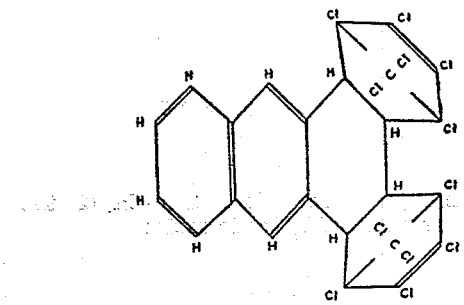

and whose empirical formula is $C_{24}H_{10}Cl_{12}$.

5. The process of forming a Diels-Alder synthesis product involving direct attachment of an aromatic ring which acts as a dienophile, which comprises reacting hexachlorocyclopentadiene with a member of the group consisting of naphthalene and anthracene, by heating said reactants at a temperature from about 50° C. to about 200° C. for a period of about 10 to 300 hours.

6. The process of forming a Diels-Alder synthesis product involving direct attachment of an aromatic ring which acts as a dienophile, which comprises reacting hexachlorocyclopentadiene with naphthalene by heating said reactants at a temperature from about 50° C. to about 200° C. for a period of about 10 to 300 hours.

7. The process of forming a Diels-Alder synthesis product involving direct attachment of an aromatic ring which acts as a dienophile, which comprises reacting hexachlorocyclopentadiene with anthracene by heating said reactants at a temperature from about 50° C. to about 200° C. for a period of about 10 to 300 hours.

8. The process of forming a Diels-Alder synthesis product involving direct attachment of an aromatic ring which acts as a dienophile, which comprises reacting hexachlorocyclopentadiene with a member of the group consisting of naphthalene and anthracene by heating said reactants at a temperature from about 120–180° C. for a period of time of about 100–300 hours.

9. The process of forming a Diels-Alder synthesis product involving direct attachment of an aromatic ring which acts as a dienophile, which comprises reacting hexachlorocyclopentadiene with a member of the group consisting of naphthalene and anthracene, by heating said reactants at a temperature from about 50° C. to about 200° C. for a period of about 10 to 300 hours and subsequently isolating the resulting diadduct from the monoadduct.

10. The process of forming a Diels-Alder synthesis product involving direct attachment of an aromatic ring which acts as a dienophile, which comprises reacting hexachlorocyclopentadiene with a member of the group consisting of naphthalene and anthracene by heating said reactants at a temperature from about 120–180° C. for a period of time of about 100–300 hours, and subsequently isolating the resulting diadduct from the monoadduct.

JULIUS HYMAN.
ABE A. DANISH.

References Cited in the file of this patent

UNITED STATES PATENTS

| Number | Name | Date |
|---|---|---|
| 2,179,809 | Bockemuller | Nov. 14, 1939 |
| 2,606,910 | Herzfeld et al. | Aug. 12, 1952 |

OTHER REFERENCES

"Chemical Abstracts," vol. 37, col. 2732 (1943). Abstract of article by Arduzov, et al., in "J. Gen. Chem." (U. S. S. R.), vol. 12, pages 206–10. (1943).

Prill, "Jour. Am. Chem. Soc.," vol. 69, pages 62–3 (1947).